Patented Apr. 5, 1938

2,112,919

UNITED STATES PATENT OFFICE 2,112,919

AZO DYESTUFFS AND THEIR PRODUCTION

Mordecai Mendoza and Francis Leslie Rose, Manchester, England, assignors to Imperial Chemical Industries Limited, a corporation of Great Britain No Drawing. Application June 20, 1934, Serial No. 731,568. In Great Britain June 23, 1933

7 Claims. (Cl. 260—72)

The present invention relates to the production of new trisazo dyestuffs by appropriate coupling of tetrazotized diaminoazobenzenes with coupling components the diaminoazobenzenes being of constitution

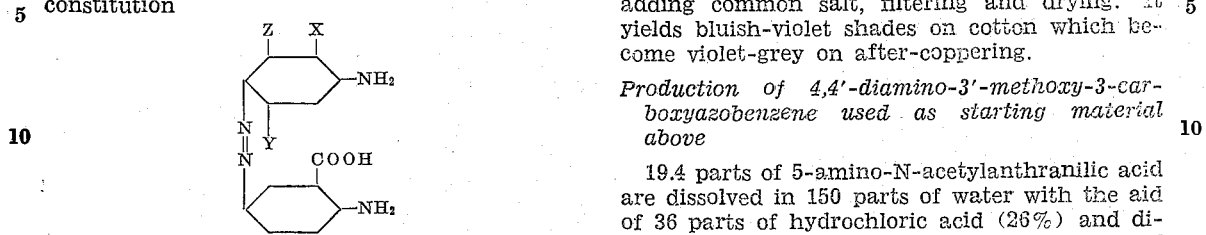

where X stands for COOH, OCH$_3$, or OC$_2$H$_5$ and of Y and Z one stands for hydrogen, Br, Cl, CH$_3$, C$_2$H$_5$, OCH$_3$, OC$_2$H$_5$, NO$_2$ or SO$_3$H and the other for hydrogen. When X=OCH$_3$, or OC$_2$H$_5$ the diaminoazo benzene may be obtained by combining diazotized 5-amino-N-acetylanthranilic acid or diazotized 6-nitro-3-aminobenzoic acid and an o-alkoxy-ω-sulpho ethylaniline (which may if desired carry substituents appropriate to give the substituted diaminoazobenzenes formulated above) the ω-sulphomethyl and acetyl groups being removed.

When X=COOH and Y and Z both=H, the diaminoazobenzene is azoanthranilic acid, a hitherto unknown dyestuff intermediate which may be obtained as described in the Patent No. 2,049,510.

When the tetrazotized diaminoazobenzenes are coupled with one or two molecules of a phenol or naphthol, the hydroxyl group being in ortho position to the azo linkage the new dyestuffs are also suitable for the production of copper-containing azo dyes in substance, for example by after-treating them with copper salts in substance.

The following examples in which parts and percentages are by weight illustrate but do not limit the invention.

EXAMPLE 1

Trisazo dyestuffs from 4,4'-diamino-3'-methoxy-3-carboxyazo-benzene and 1-naphthol-4-sulphonic acid 28.6 parts of 4,4'-diamino-3'-methoxy-3-carboxyazobenzene obtained as described at the end of this example are dissolved in 500 parts of water with the addition of 150 parts of hydrochloric acid (26%) and tetrazotized at 5-10° C. by means of 13.8 parts of sodium nitrite. The tetrazo solution obtained is then added with stirring to a solution of 44.8 parts of 1-naphthol-4-sulphonic acid in 250 parts of water containing 75 parts of calcined sodium carbonate. Coupling is very rapid and a deep bluish-violet solution is formed from which the dyestuff is isolated by adding common salt, filtering and drying. It yields bluish-violet shades on cotton which become violet-grey on after-coppering.

Production of 4,4'-diamino-3'-methoxy-3-carboxyazobenzene used as starting material above 19.4 parts of 5-amino-N-acetylanthranilic acid are dissolved in 150 parts of water with the aid of 36 parts of hydrochloric acid (26%) and diazotized at 0 to 5° C. by addition of 6.9 parts of sodium nitrite. To the diazo compound, which is mainly out of solution, sufficient sodium acetate is added to remove mineral acidity and the suspension is then added, with stirring, to a solution of 23.9 parts of the sodium salt of 2-methoxy-ω-sulphomethylaniline in 200 parts of water. Coupling, which gives a yellowish brown suspension is allowed to complete itself in about 24 hours and the suspension is then made definitely caustic alkaline by the addition of 160 parts of caustic soda lye (34%) and boiled under a reflux condenser for about 4 hours. At the end of this period hydrolysis of the coupling product is complete and the sodium salt of 4,4'-diamino-3'-methoxy-3-carboxyazobenzene is produced. The free acid is then precipitated by addition of sufficient acetic acid to impart a definite acid reaction to litmus, filtered off, dried and ground. It forms a dark yellowish-brown powder which is moderately soluble in dilute mineral acids and easily soluble in more concentrated acids and in alkalies.

Alternative method for the production of 4,4'-diamino-3'-methoxy-3-carboxyazobenzene In a mixture of 150 parts of water and 10.5 parts of caustic soda lye, there are dissolved in the given order 18.2 parts of 6-nitro-3-aminobenzoic acid and 6.9 parts of sodium nitrite. The solution is then added with stirring to a mixture of 40 parts of water, 34.5 parts of concentrated hydrochloric acid (36%) and 100 parts of ice. The diazo solution so-obtained is added with stirring to a solution of 23.9 parts of the sodium salt of 2-methoxy-ω-sulphomethylaniline in 200 parts of water and 20 parts of calcined sodium carbonate. Coupling is complete in 3 hours.

The resulting yellow-brown solution of the nitroazo compound is reduced at 50° C. during 2 hours by the slow addition of 36 parts of sodium sulphide nonahydrate crystals. 17.5 parts of caustic soda lye are then added and the strongly alkaline mixture is gently boiled for 2 hours in an open vessel. At the end of this period hydrolysis of the ω-sulphomethyl group is complete and the 4,4'-diamino-3'-methoxy-3-carboxyazobenzene is precipitated with acetic acid and isolated in the manner described above.

Example 2

*Treatment of the dyestuff of Example 1 with copper sulphate*

75.6 parts of the dyestuff obtained as in Example 1 above by coupling the tetrazo compound from 28.6 parts of 4,4'-diamino-3'-methoxy-3-carboxyazobenzene with 44.8 parts of 1-naphthol-4-sulphonic acid are dissolved in 500 parts of water with the addition of sufficient sodium carbonate to make the solution neutral to litmus paper. 50 parts of copper sulphate crystals are then added and the mixture is boiled under a reflux condenser for 3 to 4 hours. It is then made faintly alkaline by the addition of sodium carbonate and filtered while hot. On cooling, the copper complex is precipitated by means of common salt. It dyes cotton directly in violet-grey shades.

Example 3

*Trisazo dye from 4,4'-diamino-3'-methoxy-3-carboxyazobenzene and 1-amino-8-naphthol-2,4-disulphonic acid (2S-acid)*

A tetrazo solution obtained as in Example 1 from 28.6 parts of 4,4'-diamino-3'-methoxy-3-carboxyazobenzene is added with stirring to a solution of 68.2 parts of the monosodium salt of 1-amino-8-naphthol-2,4-disulphonic acid (2S-acid) in 250 parts of water containing 75 parts of calcined sodium carbonate. The coupling solution is deep blue in color and the dyestuff is precipitated when coupling is complete, by adding common salt after removing excess alkalinity. It dyes cotton in bright blue shades which are converted to greenish-blue on after-coppering.

Very similar direct and after-coppered shades are produced by the dyestuff which is obtained when the equivalent amount of 1-amino-8-naphthol-3,6-disulphonic acid is used as the coupling component.

The corresponding dyes obtained in similar manner by coupling 47.8 parts of (a) 2-amino-8-naphthol-6-sulphonic acid or (b) 47.8 parts of 2-amino-5-naphthol-sulphonic acid to the tetrazo compound prepared from 28.6 parts of 4,4'-diamino-3'-methoxy-3-carboxyazobenzene dye cotton in blackish-brown shades which are converted to brownish-black on after-treatment with copper sulphate and in royal blue shades which become slightly greener when after-coppered.

Example 4

*Trisazo dye from 4,4'-diamino-3'-methoxy-3-carboxyazobenzene and 1-phenyl-3-methyl-5-pyrazolone*

A tetrazo solution obtained as in Example 1 above from 28.6 parts of 4,4'-diamino-3'-methoxy-3-carboxyazobenzene is added with stirring at 5°–10° C. to a solution of 34.8 parts of 1-phenyl-3-methyl-5-pyrazolone in 250 parts of water and 8 parts of sodium hydroxide to which 65 parts of calcined sodium carbonate has been added. When coupling is complete the resulting dyestuff is filtered off. It dyes cotton in brownish-orange shades which are converted to red-brown by after-treatment with copper sulphate.

Example 5

*Trisazo dyestuff from azoanthranilic acid phenyl-β-napthyl-amine and 2S-acid*

A solution of 21.9 parts of phenyl-β-naphthyl-amine in 100 parts of glacial acetic acid is gradually added with vigorous stirring to a tetrazo solution obtained as in Example 6 below from 30 parts of azoanthranilic acid. Coupling is very rapid and a violet solution is obtained. This solution is added to a solution of 34.1 parts of the monosodium salt of 1,8-aminonaphthol-2,4-disulphonic acid in 250 parts of water containing 35 parts of anhydrous sodium carbonate. The further coupling gives an intensely blue solution and when complete the dyestuff is precipitated by adding common salt. It yields bright blue shades on cotton which on after-treatment with copper sulphate become greener.

Example 6

*Trisazo dyestuff from azoanthranilic acid and H-acid*

30 parts of azoanthranilic acid obtained as in Example 1 or 2 of the above-mentioned copending application are dissolved in 250 parts of water with the addition of 10.6 parts of anhydrous sodium carbonate and to the neutral solution are added 13.8 parts of sodium nitrite. When this has dissolved the mixture is cooled to 5° C. and slowly stirred into a solution of 22 parts of hydrochloric acid in 100 parts of water at 5° C. A clear solution of tetrazo compound is obtained and when tetrazotization is complete it is added to a solution of 68.2 parts of the monosodium salt of 1,8-aminonaphthol-3,6-disulphonic acid (H-acid) in 300 parts of water containing 53 parts of anhydrous sodium carbonate. Coupling is very rapid and results in the formation of a deep blue solution from which the dyestuff is precipitated by adding common salt. It is filtered, dried and ground. It dyes cotton in red-blue shades which on after treatment with copper sulphate change to bluish-green. Very similar shades are yielded by the corresponding dyestuff obtained by using, as coupling component the equivalent amount of 1,8-amino-naphthol-2,4-disulphonic acid.

Example 7

*Treatment of dyestuff of Example 6 with copper sulphate*

To the finished coupling liquor obtained as in Example 6 and without precipitating the dyestuff formed, sufficient hydrochloric acid is added to make the reaction neutral to litmus paper. 50 parts of copper sulphate crystals are added and the mixture is then boiled under a reflux condenser for 2 to 3 hours at the end of which period formation of the copper complex is complete and the solution has assumed a greenish-blue tint. 20 parts of anhydrous sodium carbonate are then added and the mixture is cooled to 15° C. Sufficient common salt is added to precipitate the copper complex and this is filtered off, dried and ground. It dyes cotton directly in greenish-blue shades.

Example 8

*Trisazo dyestuff from 4,4'-diamino-3'-methoxy-3-carboxyazobenzene and 2-amino-8-naphthol-6-sulphonic acid*

A tetrazo solution obtained as in Example 1 from 28.6 parts of 4,4'-diamino-3'-methoxy-3- carboxy-azobenzene is added with stirring to a solution of 52.2 parts of the sodium salt of 2-amino-8-naphthol-6-sulphonic acid in 400 parts of water containing 75 parts of calcined sodium carbonate. When coupling is complete the dyestuff is precipitated by adding common salt and isolated by filtration. It dyes cotton directly in blue-black shades.

Example 9

*Treatment of the dyestuff of Example 8 with copper sulphate*

82.5 parts of the dyestuff obtained as in Example 8 are dissolved in 2000 parts of water and boiled with stirring under a reflux condenser for 4 hours with a solution of 50 parts of crystallized copper sulphate in 200 parts of water and 200 parts of concentrated aqueous ammonia (30%). The copper complex, which partly comes out of solution, is completely precipitated by adding common salt and isolated by filtration. It dyes cotton directly in a neutral grey shade, fast to light and washing.

Very similar direct and copper-containing dyestuffs are produced when 4,4'-diamino-3'-methoxy-3-carboxy-6'-methylazobenzene is used as the tetrazotizable component in Examples 8 and 9 in place of 4,4'-diamino-3'-methoxy-3-carboxyazobenzene.

4,4'-diamino-3'-methoxy-3-carboxy-6'-methylazobenzene is obtained as follows.

*Production of 4,4'-diamino-3'-methoxy-3-carboxy-6'-methylazobenzene*

13.7 parts of cresidine (m-amino-p-cresol methyl ether) are precipitated in a suitable physical form by dissolving in a mixture of 200 parts of water and 10 parts of hydrochloric acid (36%) and adding 10 parts of sodium bicarbonate. A further 40 parts of sodium bicarbonate are added and a diazo solution which has been prepared from 18.2 parts of 6-nitro-3-aminobenzoic acid by the method described in Example 1 is added, keeping the temperature of the coupling mixture at 5° C. The coupling is complete in 3 hours. The resulting orange-brown coloured solution is heated to 60° C. and 36 parts of sodium sulphide nonahydrate crystals are added during 1 hour at this temperature. It is then reduced to 15° C. and the 4,4'-diamino-3'-methoxy-3-carboxy-6'-methylazobenzene is precipitated by the addition of sufficient glacial acetic acid, filtered, washed with water and dried. The product is a dark brown amorphous powder, readily soluble in aqueous alkalies and in fairly concentrated acids.

Example 10

*Trisazo dyestuff from azo-anthranilic acid and 2-N-β-hydroxy-ethylamino-5-naphthol-7-sulphonic acid*

The tetrazo compound obtained as in Example 6 from 30 parts of azo-anthranilic acid is added to a solution of 61 parts of the sodium salt of 2-N-β-hydroxyethylamino-5-naphthol-7-sulphonic acid in 300 parts of water containing 53 parts of anhydrous sodium carbonate. Coupling results in the formation of a reddish-blue solution and when complete the coupling liquor is made neutral to litmus paper by means of hydrochloric acid.

Example 11

*Treatment of the dyestuff of Example 10 with copper sulphate*

50 parts of copper sulphate crystals are then added to the neutralized solution of Example 10 and the mixture is boiled under a reflux condenser for 2 to 3 hours, at the end of which period formation of the copper complex is complete. Sufficient sodium carbonate is added to make the mixture alkaline to litmus paper and the new copper complex is precipitated by adding common salt. It dyes cotton directly in blue shades of very good fastness to light.

We claim:—
1. The method of preparing an azo dyestuff which comprises tetrazotizing 4,4'-diamino-3'-methoxy-3-carboxyazobenzene and coupling it in alkaline medium with 2-amino-8-naphthol-6-sulphonic acid.
2. A dyestuff being the compound:

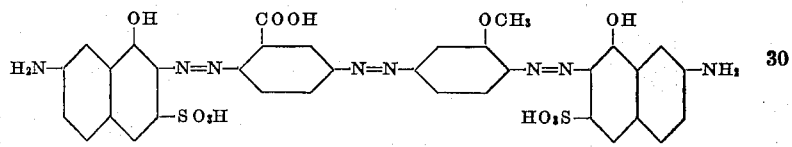

3. The process which comprises diazotizing a compound represented by the formula:

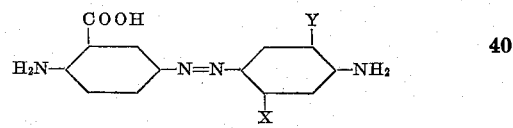

in which X is one of a group consisting of hydrogen, methyl, and ethyl and Y is one of a group consisting of methoxy and ethoxy, and coupling it to an amino-naphthol-sulphonic acid.

4. A compound represented by the formula:

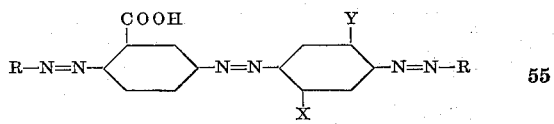

in which X is one of a group consisting of hydrogen, methyl, and ethyl, Y is one of a group consisting of methoxy and ethoxy, and R is a radical of an amino-naphthol-sulphonic acid coupled in a position ortho to an hydroxyl group.

5. The compound represented by the formula:

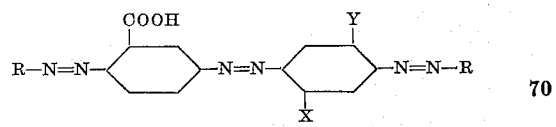

in which X is one of a group consisting of hydrogen, methyl, and ethyl, Y is one of the group consisting of methoxy and ethoxy, and R is a radical from the group consisting of naphthol-sulphonic acid, amino-naphthol-sulphonic acid, and phenyl-methyl-pyrazolone.
6. The compound represented by the formula:
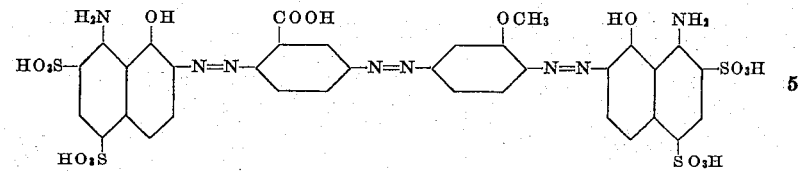
7. The compound represented by the formula:
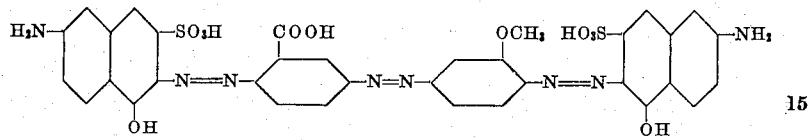
MORDECAI MENDOZA.
FRANCIS LESLIE ROSE.